Patented Nov. 4, 1952

2,616,786

UNITED STATES PATENT OFFICE 2,616,786

AMMONIUM NITRATE IN FREE-FLOWING FORM AND METHOD OF PREPARING SAME

John Whetstone, West Kilbride, Scotland, assignor to Imperial Chemical Industries Limited, a corporation of Great Britain No Drawing. Application July 12, 1949, Serial No. 104,389. In Great Britain April 26, 1949

15 Claims. (Cl. 23—103)

The present invention is concerned with providing ammonium nitrate in a free-flowing form in which the tendency towards caking or setting of the salt is much reduced and is an improvement in or modification of the invention claimed in co-pending U. S. application Serial No. 40,439, filed July 23, 1948, now abandoned, an application of addition to co-pending U. S. application Serial No. 786,785, filed November 18, 1947, now abandoned, hereinafter referred to as the main application.

In said main application there is claimed a modified ammonium nitrate consisting of a mixture of 100 parts of ammonium nitrate and 0.01 and 1.0 part of the mixture of the sodium or ammonium salts of the di- and tri-sulphonic acids of para-rosaniline and rosaniline commercially known as the dyestuff Acid Magenta (Colour Index 692). It is stated therein that the quantity of Acid Magenta is preferably 0.05 to 0.10 part per 100 parts of ammonium nitrate.

In co-pending U. S. application Serial No. 40,439, filed July 23, 1948 it is stated that it has been found that certain dyestuffs of sulphonated aromatic character, other than Acid Magenta (No. 692) when distributed externally in proportion of about 0.10% over the surfaces of ammonium nitrate in crystalline form or produced by a spray crystallization process, improve the resistance to caking shown by the ammonium nitrate.

It is also stated therein in this connection that it has been found that certain dyestuffs of sulphonated aromatic character other than Acid Magenta exercise an effect on the crystal habit of ortho-rhombic ammonium nitrate IV, which normally crystallizes as [110] prisms or needles. It is further stated that it has been found that the effect of a given dyestuff on the setting of ammonium nitrate is linked with the magnitude of the crystal habit modification brought about on the salt by a saturated solution of the dyestuff in the saturated salt solution (mother liquor) and that the solubility of the dyestuff in saturated ammonium nitrate solution at the ordinary temperature is clearly an important factor in deciding the magnitude of the crystal habit modification to be expected—but the number of the sulphonic acid substituent groups in the aromatic nucleus of the dyestuff are also very important in conferring sufficient solubility on the dyestuff.

Furthermore it is also remarked in said application of addition U. S. application Serial No. 40,439 that as the setting of ammonium nitrate appears to be essentially a process of recrystallization of the ammonium nitrate contained as saturated solution in the moist salt, the effect of a dyestuff of sulphonated aromatic character on the crystal habit of the salt is likely to be reflected in its effect on the setting of the salt, depending on the magnitude of the effect exerted on the crystal habit and in general, when the presence of a dyestuff of sulphonated aromatic character in the crystallizing solution results in the crystallization of the ammonium nitrate in the form of minute fragile scales or plates, a considerable reduction in setting is likely to be achieved, but the formation of better defined crystal forms is likely to reduce the effect of the dyestuff on setting of ammonium nitrate. It is further remarked therein the general effect of these dyestuffs of sulphonated aromatic character on the crystal habit of ammonium nitrate IV, is to induce the formation of [010] prisms, laths, plates or scales instead of the usual [110] elongated prisms or needles.

In accordance with the invention claimed in U. S. application Serial No. 40,439 the improvement in or modification of the invention of the main U. S. application Serial No. 786,785 consists in the provision of a modified ammonium nitrate consisting of a mixture of 100 parts of ammonium nitrate and 0.01 to 1 part of at least one dyestuff of sulphonated aromatic character, other than Acid Magenta (No. 692), which is soluble to the extent of at least 0.01% in a saturated aqueous ammonium nitrate solution at ordinary atmospheric temperature.

It has now been found that particularly improved results are obtained if the dyestuff of sulphonated aromatic character included is one having a solubility of not less than 0.5% in a saturated aqueous ammonium nitrate solution at ordinary atmospheric temperatures and preferably is one which has a higher solubility than 0.5%; and if the dyestuff of sulphonated aromatic character is a soluble salt of a poly-sulphonated derivative of a diamino or triamino substituted triaryl methane dyestuff or a lower N-alkyl mono- to tetra-substituted compound of any one such dyestuff.

According to the present invention therefore the improvement in or modification of the invention of U. S. application Serial No. 40,439, the first application of addition to the main U. S. application Serial No. 786,785, consists in the provision of a modified ammonium nitrate consisting of a mixture of 100 parts ammonium nitrate and 0.001 to 1.0 part of a soluble salt of a poly-sulphonated derivative of a diamino or triamino substituted triaryl methane dyestuff or a lower N-alkyl mono- to tetra-substituted compound of any one such dyestuff, said poly-sulphonated derivative having a solubility of at least 0.5% in a saturated aqueous ammonium nitrate solution at 20° C. and which in solution in a saturated aqueous solution of ammonium nitrate conditions said ammonium nitrate solution to produce on crystallization in the temperature range in which the stable form of ammonium nitrate is ammonium nitrate IV crystals of ammonium nitrate IV as [010] prisms, laths, plates or scales and not as the usual [110] elongated prisms or needles.

By the term "lower alkyl" is to be understood alkyl groups having up to 3 carbon atoms.

By the term "aryl" is to be understood simple monocyclic aromatic residues particularly phenyl and tolyl.

It has to be understood that the modified ammonium nitrate can include mixtures of the sulphonated dyestuffs as hereinbefore defined, and if desired one or more of the said sulphonated dyestuffs can be in admixture with Acid Magenta (No. 692). Ammonium nitrate modified by the admixture of a mixture of the sodium or ammonium salts of the di- or tri-sulphonated acids of pararosaniline and rosaniline, which two dyestuffs in admixture form Acid Magenta (No. 692), forms the subject matter of our main application co-pending U. S. Application Serial No. 786,785.

Typical dyestuffs which have been found to be effective are:

Tri-sulphonated pararosaniline (pp'p" triamino triphenyl methane) ammonium salt;

Tri-sulphonated rosaniline (pp'p" triamino diphenyltolylmethane) ammonium salt;

Tri-sulphonated New Magenta (pp'p" triamino tritolylmethane) ammonium or calcium salt;

Tri-sulphonated p'p'p" triamino phenyldi-tolylmethane, ammonium salt;

Red Violet 5 RS (Rowe's Colour Index No. 693); which is a mixture of the sodium salts of di- and tri-sulphonic acids of N-ethyl rosaniline.

Red Violet 4RS (sulphonated dimethyl rosaniline, Na salt) (Rowe's Colour Index 664).

Sulphonated diaminohydroxy triphenylmethane (prepared by diazotisation and hydrolysis of one $NH_2$ group of sulphonated p-rosaniline).

Trisulphonated monomethyl triamino tritolylmethane, sodium salt.

Ammonium nitrate according to the invention can be formed by direct crystallization from a solution containing at least one of the said dyestuffs or while undergoing crystallization or granulation in for example a graining kettle or incorporator in the presence of sufficient quantity of any one or more of said dyestuffs as hereinbefore defined.

The addition of for instance 0.001 to 1.0 part in solution or 0.1 to 1 part in the dry condition of any one or more of said dyestuffs as herein before defined to 100 parts of spray crystallized ammonium nitrate also lessens the tendency towards caking or setting. Ammonium nitrate can also be sprayed with a liquid containing the said dyestuff in aqueous solution. Ammonium nitrate can also be treated with a solution of said sulphonated derivative of a diamino or triamino substituted triaryl methane dyestuff as hereinbefore defined in liquid ammonia or Diver's Liquid and subsequently evaporating the liquid ammonia. The said dyestuff can also be applied when absorbed in an absorbing material such as kieselguhr.

Ammonium nitrate modified according to the invention has been found to be particularly suitable for incorporation in explosive compositions.

The following examples illustrate how ammonium nitrate according to the present invention can be produced. The parts are parts by weight.

*Example 1*

The surfaces of ammonium nitrate granules produced by a spray crystallization process of particle size 30 to 100 B. S. S. are treated with a 10% aqueous solution of triamino tritolylmethane tri-sulphonate ammonium salt, so that the modified ammonium nitrate contains 0.33% of the dyestuff. The granules are dried and the dry product preserves the original form of the granules, and is free running and markedly resistant to setting.

*Example 2*

Ammonium nitrate granules produced by a spray crystallization process of particle size 30 to 100 B. S. S. are treated with a solution of triamino tritolylmethane tri-sulphonate, ammonium salt, in liquid ammonia so that 0.03% of the dyestuff remains on the granules of ammonium nitrate after the evaporation of the ammonia. The colour of the dyestuff does not appear until the ammonia is removed. The ammonium nitrate preserves the original form of the granules and is free running and resistant to setting.

*Example 3*

Ammonium nitrate is produced containing 0.05% of the dyestuff used in Examples 1 and 2 by the application of the said dyestuff as a solution in a mixture of 75 parts ammonium nitrate and 25 parts liquid ammonia (Diver's Liquid). The colour of the dyestuff does not appear until the ammonia is removed. The modified ammonium nitrate has the original form of the granules and is free running and resistant to setting.

*Example 4*

5 parts of the dyestuff used in Examples 1 to 3 are dissolved in hot water and mixed with 95 parts kieselguhr and the mixture dried. 100 parts of ammonium nitrate granules as used in Examples 1 to 3 are admixed with 1 part of the thus treated kieselguhr. When the ammonium nitrate absorbs moisture the dye is leached out by the surface film of saturated solution produced. The treated kieselguhr also improves the free running qualities of the ammonium nitrate which is rendered resistant to setting by the dye treatment.

*Example 5*

The surfaces of ammonium nitrate granules produced by a spray crystallization process, of particle size 10–30 B. S. S., are treated with a 10% aqueous solution of triamino triphenyl methane trisulphonate, ammonium salt, so that the modified ammonium nitrate contains 0.009% of the dyestuff. The granules are dried and the dry product preserves the original form of the granules, and the free running qualities and particularly the resistance to caking are improved.

*Example 6*

The moist crystals of ammonium nitrate, produced directly from aqueous solution, are treated with .05% of triamino tritolylmethane trisulphonate, ammonium salt, either dry or in aqueous solution, and the product is passed through a rotatory drier to ensure adequate mixing. When dry the product is of markedly improved resistance to caking.

Example 7

Ammonium nitrate in an edge-runner mill is treated with 0.5% of water containing 10% of triamino tritolylmethane trisulphonate, ammonium salt, in solution. The dye is distributed during 20 minutes' milling, and the finely divided product, containing 20–30% of particles passing a 200 mesh B. S. S., sieve, which in the absence of the dye is liable to cake that its use is severely restricted or even impossible in the explosive art, now remains soft and friable for considerable periods after manufacture, even under unfavourable climatic conditions.

Example 8

Ammonium nitrate, in the form of granules 30–100 B. S. S. produced by a spray crystallization process, is treated with 0.1% of a mixture of the sodium salts of the di- and tri-sulphonates of dimethyl rosaniline, known as Red Violet 4 R. S. (C. I. 694), applied from aqueous solution. The product after drying is of unaltered particle form, but is remarkably resistant to caking.

Example 9

Ammonium nitrate is crystallized from aqueous solution with vigorous stirring, in the presence of 0.1% of the sodium salt of the trisulphonate of monomethyl triamino diphenyl tolyl methane, so as to give very tiny crystals. These crystals, separated from their mother liquor, dried and repulverized are markedly resistant to caking.

Example 10

Ammonium nitrate in the form of a 95% aqueous solution at an elevated temperature is crystallized, in the presence of 0.05% of the ammonium salt of the trisulphonate of ethyl rosaniline, known as Red Violet 5 R. S. (C. I. 693) in the saline solution, in a graining kettle, Fauser crystallizer, or similar apparatus, so that the heats of crystallization and transition of the ammonium nitrate serve to evaporate the contained water. A dry product, markedly resistant to setting when cold is obtained.

I claim:

1. Modified ammonium nitrate consisting of a mixture of 100 parts ammonium nitrate and from .001 to 1.0 part of a soluble salt of a poly-sulphonated derivative of a dyestuff selected from the group consisting of diamino and triamino substituted triaryl methane dyestuffs and lower N-alkyl mono to tetra substituted derivatives thereof, said poly-sulphonated derivative having a solubility of at least 0.5% in a saturated aqueous ammonium nitrate solution at 20° C., and which in solution in a saturated aqueous solution of ammonium nitrate conditions said solution to produce on crystallization in the temperature range in which the stable form of ammonium nitrate is ammonium nitrate IV crystals of ammonium nitrate IV as [010] prisms, laths, plates or scales.

2. Ammonium nitrate as claimed in claim 1 wherein the dyestuff is tri-sulphonated monomethyl triamino tritolylmethane, sodium salt.

3. A method for the production of modified ammonium nitrate which comprises incorporating into 100 parts of said ammonium nitrate from .001 to 1 part of a soluble salt of a poly-sulphonated derivative of a dyestuff selected from the group consisting of diamino and triamino substituted triaryl methane dyestuffs and lower N-alkyl mono to tetra substituted derivatives thereof, said poly-sulphonated derivative having a solubility of at least 0.5% in a saturated aqueous ammonium nitrate solution at 20° C. and which in solution in a saturated aqueous solution of ammonium nitrate conditions said solution to produce on crystallization in the temperature range in which the stable form of ammonium nitrate is ammonium nitrate IV crystals of ammonium nitrate IV as [010] prisms, laths, plates or scales.

4. A method for the production of ammonium nitrate as claimed in claim 3 which comprises effecting direct crystallization of ammonium nitrate from a solution containing at least one of the said dyestuffs.

5. A method for the production of ammonium nitrate as claimed in claim 3 which comprises effecting granulation of aqueous solutions of ammonium nitrate containing at least one of the aforesaid dyestuffs.

6. A method for the production of ammonium nitrate as claimed in claim 3 which comprises adding 0.1 to 1.0 part of at least one of the aforesaid dyestuffs by dry admixture to 100 parts of spray crystallized ammonium nitrate.

7. A method for the production of ammonium nitrate as claimed in claim 3 which comprises spray crystallizing ammonium nitrate from the concentrated aqueous solution, and wetting the granules thus formed after solidification and before drying with an aqueous solution of at least one of the said dyestuffs.

8. A method as claimed in claim 3 which comprises treating ammonium nitrate with a solution of at least one of said dyestuffs in liquid ammonia and subsequently evaporating the liquid ammonia.

9. A process as claimed in claim 3 which comprises treating ammonium nitrate with a solution of at least one of said dyestuffs in a mixture of ammonium nitrate and liquid ammonia, and subsequently evaporating the liquid ammonia.

10. A process as claimed in claim 3 which comprises applying to ammonium nitrate at least one of said dyestuffs absorbed in an absorbent material.

11. A method as claimed in claim 10 wherein the absorbing material is kieselguhr.

12. Ammonium nitrate as claimed in claim 1 wherein the dyestuff is tri-sulphonated pararosaniline ammonium salt.

13. Ammonium nitrate as claimed in claim 1 wherein the dyestuff is trisulphonated rosaniline ammonium salt.

14. Ammonium nitrate as claimed in claim 1 wherein the dyestuff is trisulphonated pp' p'' triamino tritolyl methane ammonium salt.

15. Ammonium nitrate as claimed in claim 1 wherein the dyestuff is a mixture of the sodium salts of di- and tri-sulphonic acids of N-ethyl rosaniline.

JOHN WHETSTONE.

REFERENCES CITED

The following references are of record in the file of this patent:

UNITED STATES PATENTS

| Number | Name | Date |
|---|---|---|
| 2,377,670 | Burdett | June 5, 1945 |
| 2,383,763 | Bloch et al. | Aug. 28, 1945 |